Feb. 20, 1945.   C. B. WILLIAMS ET AL   2,369,700
WRINGER
Filed Dec. 28, 1938   6 Sheets-Sheet 1

INVENTOR.
CHARLES B. WILLIAMS and
THANKMAR W. KAESTNER
BY
Bray, Oberlin & Bray
ATTORNEYS.

Feb. 20, 1945.    C. B. WILLIAMS ET AL    2,369,700
WRINGER
Filed Dec. 28, 1938    6 Sheets-Sheet 3

INVENTOR.
CHARLES B. WILLIAMS and
THANKMAR W. KAESTNER
BY
Bair, Oberlin & Bair
ATTORNEYS Feb. 20, 1945.   C. B. WILLIAMS ET AL   2,369,700
WRINGER
Filed Dec. 28, 1938   6 Sheets-Sheet 4

INVENTOR.
CHARLES B. WILLIAMS and
THANKMAR W. KAESTNER
BY
ATTORNEYS.

Feb. 20, 1945. C. B. WILLIAMS ET AL 2,369,700
WRINGER
Filed Dec. 28, 1938 6 Sheets-Sheet 5

INVENTOR.
CHARLES B. WILLIAMS and
THANKMAR W. KAESTNER
BY
ATTORNEYS.

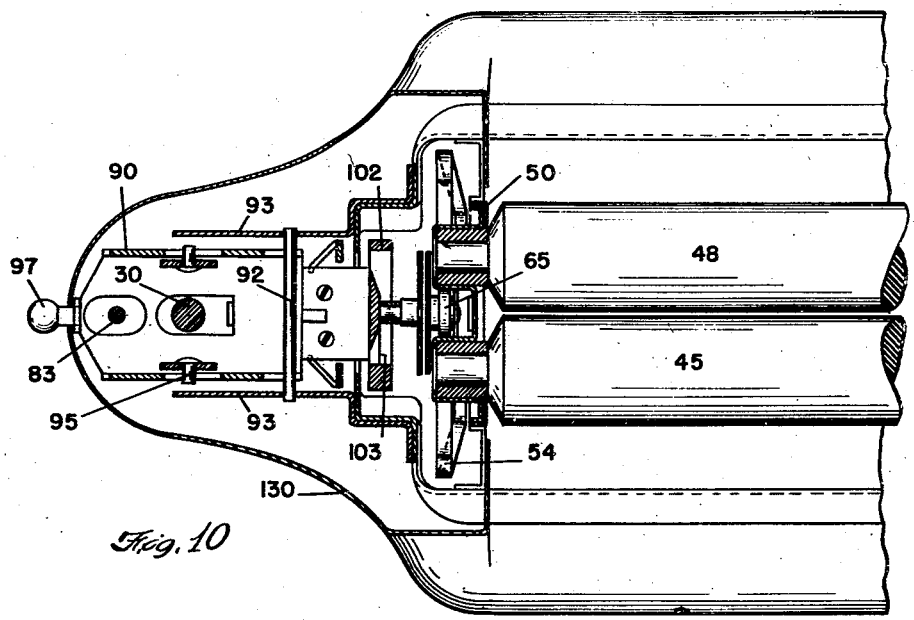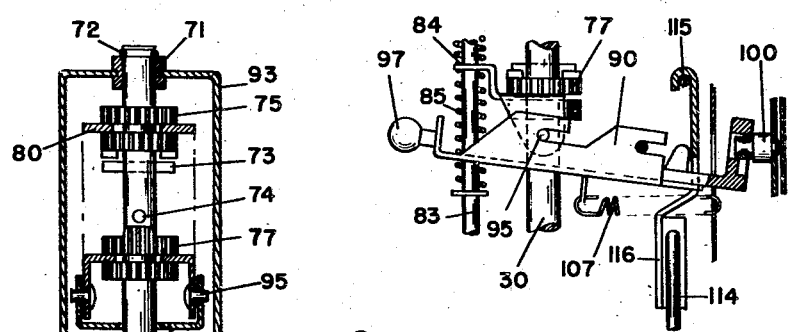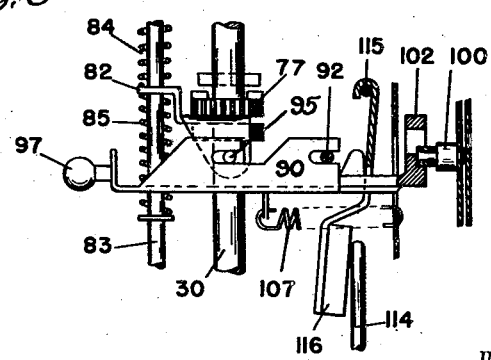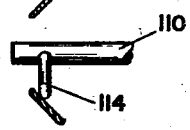

Patented Feb. 20, 1945

2,369,700

UNITED STATES PATENT OFFICE 2,369,700

WRINGER

Charles B. Williams, Shaker Heights, and Thankmar Walter Kaestner, Cleveland, Ohio, assignors, by direct and mesne assignments, to Automatic Safety Wringer Company, Cleveland, Ohio, a partnership composed of Charles B. Williams, Horace B. Fay, and Charles W. Williams Application December 28, 1938, Serial No. 248,092

7 Claims. (Cl. 68—253)

This invention relates to a multiple clothes wringer of the type in which there is provided a feed bite to which clothes are first fed and a wringing bite which extracts the remainder of the moisture from the clothes.

This invention is particularly directed to a sheet metal clothes wringer of the type in which one roll coacts with two other rolls to provide a pair of roll bites. There is also included mechanism by which the relative location of the wringing bite and the feed bite may be reversed to permit feeding clothes to the wringer from either side. We also provide power mechanism to drive the rolls, which mechanism includes reversing means to reverse the roll direction of rotation. Coupled with the mechanism above generally described is release mechanism by which the wringer may be either manually or automatically stopped to prevent injury to the operator. There is also included mechanism to control the beginning of roll rotation independently of the mechanism by which the relative location of the bites is effected.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

Figure 1:
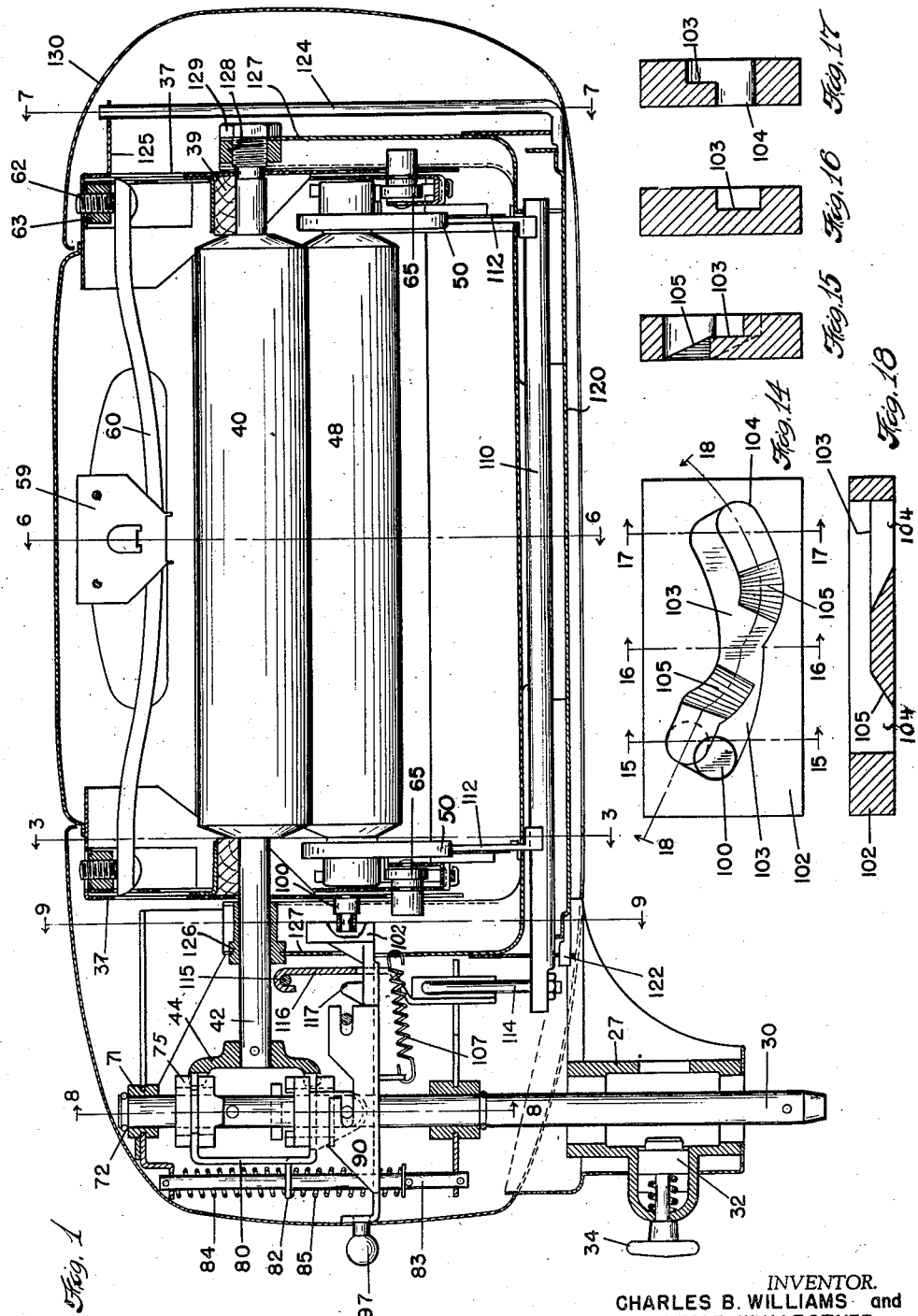
Fig. 1 is a longitudinal section through our improved wringer.
Figure 5:
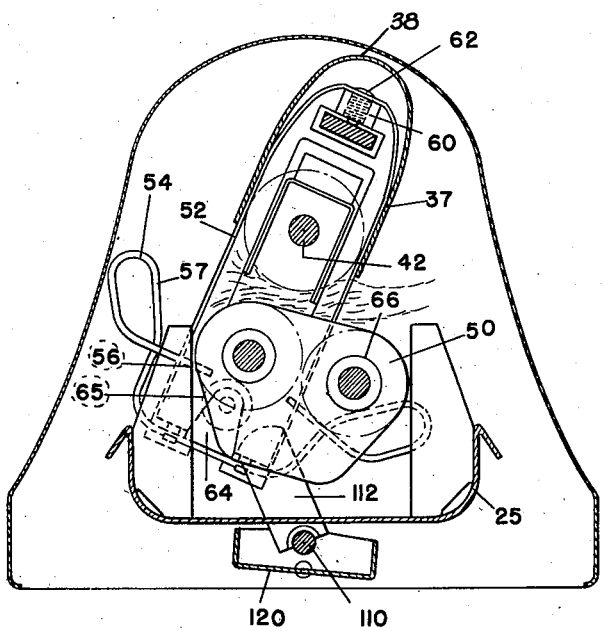
Figure 9:
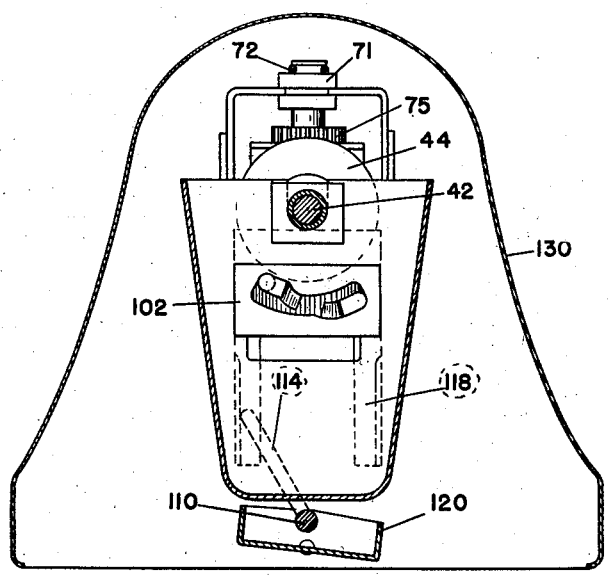
Figure 6:
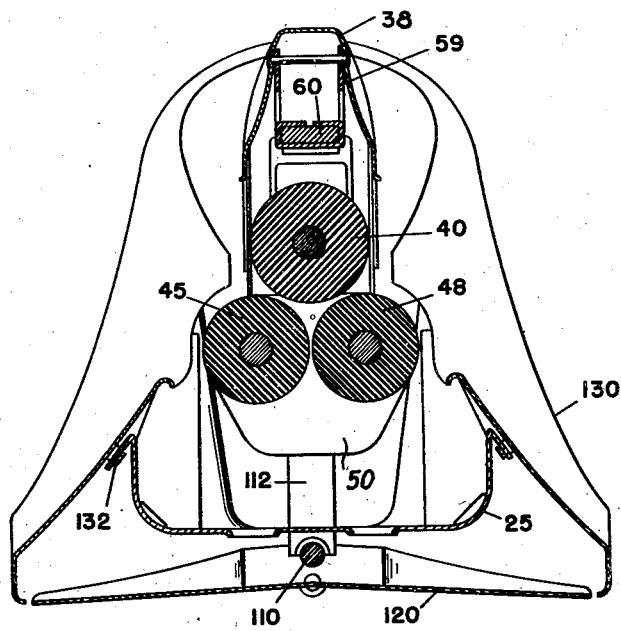
Figure 7:
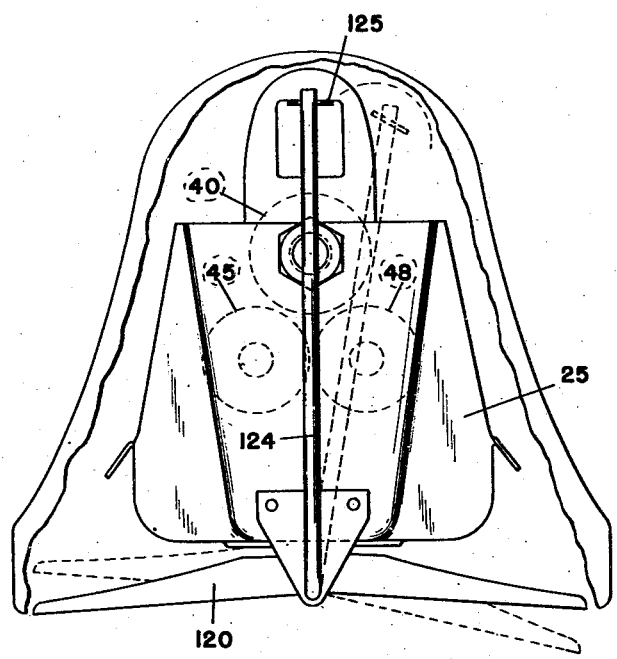

Figs. 6 and 7 are sections through Fig. 1 as indicated by the lines 6—6 and 7—7, respectively, with the rolls of Fig. 5 separated by the clothing being wrung;

Figs. 8 and 9 are sections through Fig. 1, as indicated by the lines 8—8 and 9—9, respectively;

Fig. 10 is an irregular horizontal section through Fig. 1 showing details of the drive mechanism;

Figs. 11 and 12 are fragmentary sections in the plane of Fig. 1 showing details of the release and starting mechanism;

Fig. 13 is a detailed release mechanism;

Fig. 14 is a plan view of the release cam; and

Figs. 15, 16, 17 and 18 are sections through the cam of Fig. 14, as indicated by the corresponding lines thereon.

Referring to Figs. 1, 2, 3 and 6 particularly, it will be seen that we provide a main frame 25 which, at one end, is secured to a downwardly depending head 27 rotatably carrying a drive shaft 30 adapted for mounting on a washing machine wringer post. By means of a spring button 32, controlled through a handle 34, the wringer may be rotatably secured in any desired position on the washing machine in a manner well understood in the art.

Figure 2:
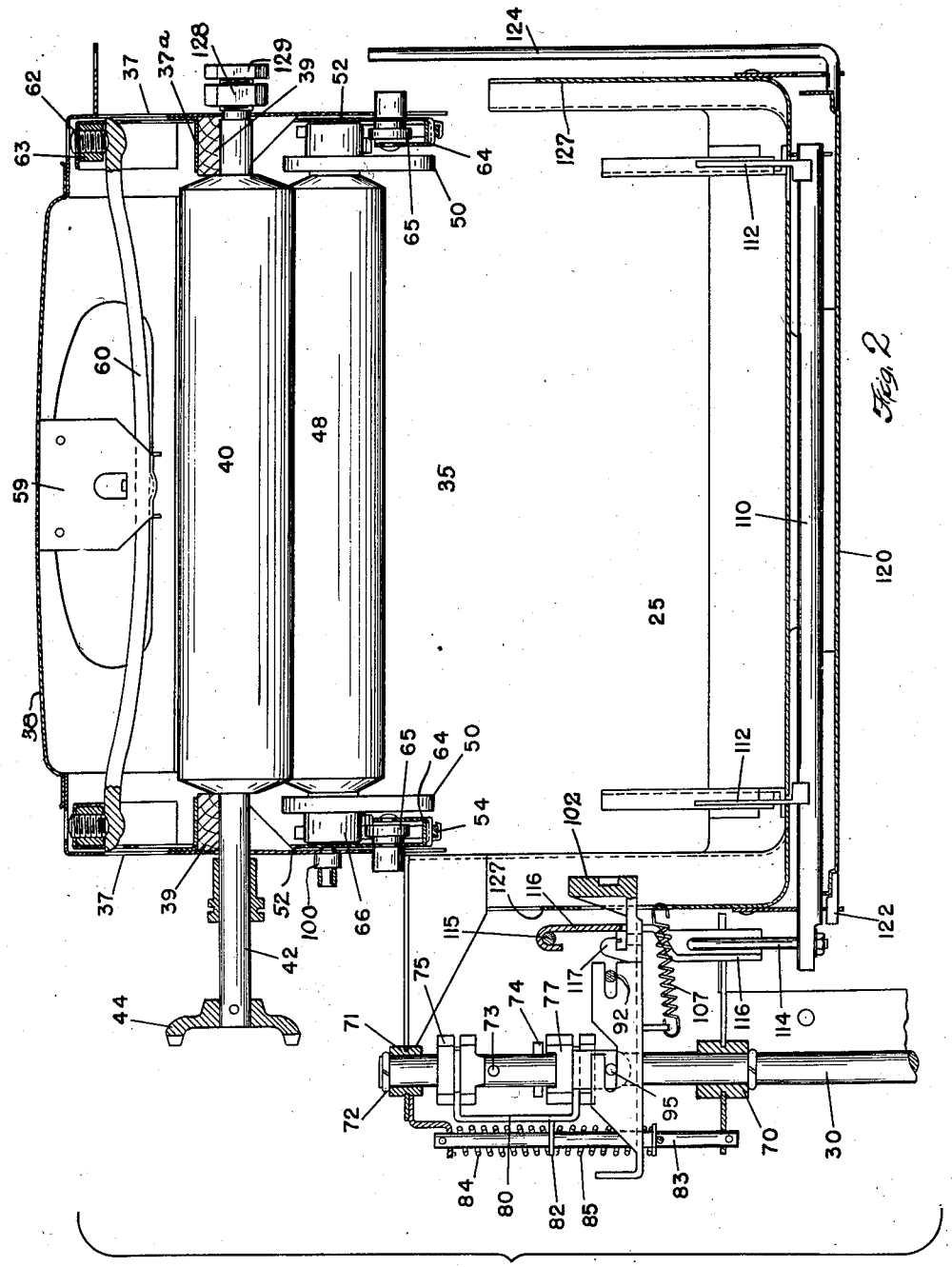
Fig. 2 is a section showing the skeleton mechanism of Fig. 1 with the upper sub-frame lifted out of the main frame.

A sub-frame assembly, best shown in Fig. 2 and indicated generally at 35, is adapted for mounting in the main frame 25. This sub-frame comprises a pair of uprights 37 joined by a top 38. Each upright is provided with an inwardly extended journal box 37ª in which is mounted a journal 39 adapted to position the upper wringer roll 40. At the drive end of the wringer the roll shaft is extended as at 42 and carries a bevel gear 44 to drive the wringer as hereafter described. A pair of lower rolls 45 and 48 (Fig. 6) are supported in double journal blocks 50 (Fig. 3) at each end of the wringer. These journal blocks are stampings and each carry two spaced wooden journals to accommodate the shafts of the rolls 45 and 48 to maintain the two rolls slightly out of contact with each other.

One lower roll tends to strip material from the other roll and prevent the same from passing downwardly between the rolls when clothes are fed to the wringer. Heretofore in wringers of this type there have been provided guide members interposed between two corresponding rolls to effect the stripping action. We eliminate such guide by the construction above described.

The lower roll journal blocks 50 are supported in hangers 52 (Fig. 2), each of which hangers is slidably mounted within the corresponding upright 37. Secured to the lower portion of each hanger is a peculiarly shaped spring 54 (Fig. 3).

These springs not only support the lower rolls when the wringer is in a neutral position, but apply the auxiliary pressure at the roll bite acting as a feed bite by lightly urging the corresponding lower roll toward the upper roll. As shown in Fig. 3, in the neutral position of the rolls, an inwardly extending wing 56 at each side of each spring resiliently supports an end of the lower roll journals 50. When the mechanism is shifted to an active position, as shown in Fig. 4, a portion 57 of each spring 54 bears against the respective end of a journal block 50 to urge the corresponding roll toward the top roll with the proper pressure therebetween to establish an intake bite. It will be seen that, due to the length of the spring arms, the portion 57 is less resilient than the portion 56. Lateral shifting of the two lower rolls is limited by uprights 58 welded to the frame 25.

A pressure wringing bite is established between the top roll and the lower roll not acting to form the feed bite. The pressure mechanism by which this is accomplished is best shown in Figs. 2, 3 and 4. As there shown the top 38 is provided with a bracket 59 which supports a leaf spring 60 at its mid-portion. The ends of the spring 60 bear against threaded studs 62, threadingly received in blocks 63 secured to the upper end of each hanger 52. Slack between the spring ends and the hangers is taken up by the member 62. At the lower end of each hanger there is provided an upturned flange 64 which cooperates with the hanger proper to receive a roller 65.

Figure 3:
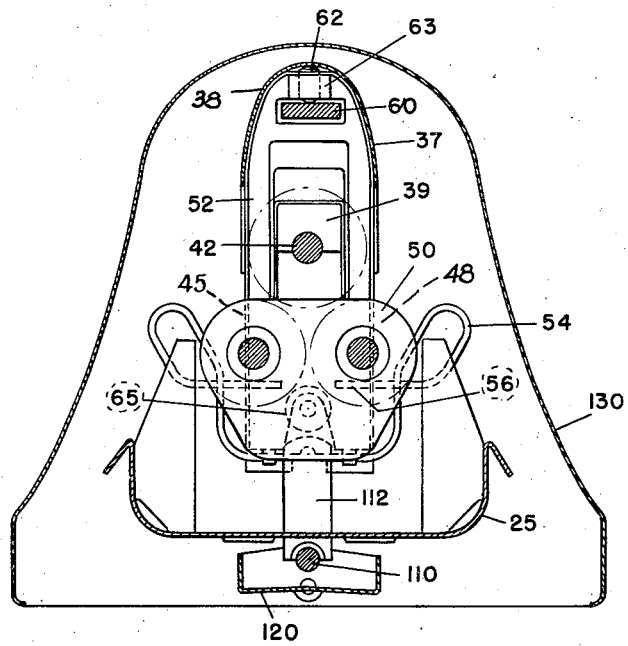
Fig. 3 is a section as indicated by the lines 3—3 of Fig. 1.
Figure 4:
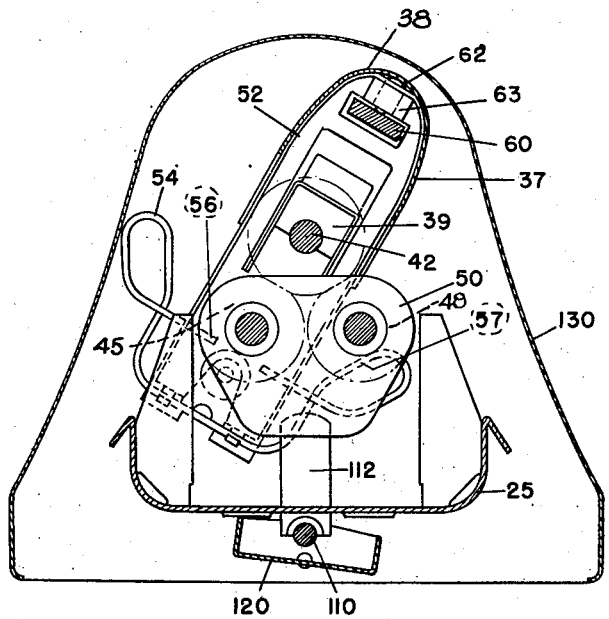
Figs. 4 and 5 are similar sections showing the mechanism in different operative positions.

When the wringer is in the neutral position as shown in Fig. 3 the rollers 65 lie idly between the lower rolls 45 and 48. When the position of Fig. 4 is assumed, however, the rollers 65, as shown in that figure, move toward the left-hand side of the journal blocks 50 and bear against bosses 66 (Fig. 2) to urge the same upwardly. This upward urging is accomplished by reason of the length of the hangers, together with the resiliency of the spring 60, and thus in the position of Fig. 4 the roll 45 is drawn and maintained upwardly against the roll 40 to provide a clothes wringing bite.

In partial summation, and referring to Fig. 4, it will be seen that the top 38 has been pivoted about the axis of the roll 40 to establish the pressure bite just described. Simultaneously, the corresponding portions 57 of respective springs 54 provide a light pressure auxiliary bite between the lower roll 48 and the upper roll 40. In this position the wringer is driven as hereafter described to feed clothes therethrough from the right to the left. Thus, the roll immediately adjacent the operator is a light pressure feeding bite, from which the hands may be easily withdrawn without injury. Further, as hereafter described, automatic mechanism is provided to terminate the wringer operation if the feed bite rolls are separated beyond a predetermined amount, as by the passage of an operator's hand thereinto.

Drive mechanism

The wringer drive mechanism is best shown in Figs. 1, 2, 8, 11 and 12, with particular reference to the skeleton picturization of Fig. 2.

As shown in that figure, the shaft 30, journaled in the main frame as at 70 and 71, is retained from falling out by a spring clip 72 engaging an annular recess thereof. Two pins 73 and 74 pass through the shaft and are fixed therein. A pair of spur gears 75 and 77 are slidably mounted on the shaft and are each provided with recesses in which respective pins 73 or 74 may lie to drive the gear engaged. The two gears are each provided with an annular groove which receives horizontal tongues of a U-bracket 80, by which the gears are retained in place and spaced from each other.

In the assembled position of the wringer the gear 44 on the roll shaft 42 simultaneously engages each of the gears 75 and 77 (Fig. 1) and the U-bracket 80 is shifted vertically to engage either of the gears 75 or 77 with the corresponding shaft pins to drivingly rotate the same. The gear so driven will in turn drive the gear 44 and the roll 40. Through friction contact with the rolls 45 and 48 each of these will also be driven to perform the wringing function.

The wringer drive is established independently of the shifting of the top sub-frame from the right to the left to correspondingly shift the location of the pressure bite. An ear 82 is formed on the U-bracket 80 and is provided with an opening, through which passes the spring rod 83. A pair of springs 84 and 85 are carried on the spring rod and each bears against a face of the ear 82 to normally maintain the U-clip and the gears 75 and 77 in a neutral position; that is, each out of contact with the pins 73 and 74.

To engage the wringer drive, the mechanism shown in Figs. 11 and 12 is provided. This comprises a plate 90 slidably and rotatably carried on a pin 92 which is secured in side flanges 93 of the main frame. The plate 90, provided with upturned flanges, slidingly engages a pair of pins 95, as shown in Fig. 11, which pins are secured in downward depending ears of the U-clip 80. A hand knob 97 is secured to the plate and, as shown in Fig. 1, extends on the outside of the wringer. Through a slot in the wringer shroud, the knob 97 may be raised or lowered and from the foregoing description it will be seen that such movement will respectively engage gear 77 or gear 75 with its corresponding pin in the shaft 30.

The wringer drive, once established, is maintained in a manner now to be described. Carried by the left-hand upright 37 is a small roller 100 (Figs. 1, 11 and 12). This roller is adapted to normally ride in a cam 102, shown in Figs. 14 through 18 inclusive. Referring to the elevation of Fig. 14 and sectional drawings thereof, it will be seen that the cam is provided with a recessed face 103. It will further be seen that the recessed face is provided at the ends on opposite sides thereof with a portion 104 cut completely through the cam. An inclined shoulder 105 leads downwardly from the face 103 as shown in Fig. 18. This cam, as shown in Figs. 11 and 12, is secured to the plate 90 and tilts therewith as the plate rocks about the pin 92. A spring 107 (Figs. 1, 11 and 12) normally pulls the plate and cam as far to the right as possible.

The drive for the rolls established by rocking the knob 97 up or down, depending on the direction of rotation desired, is maintained by the cooperation of the roller 100 with the above described cam. The cam is so mounted with relation to the roller that as the top 38 is swung either to the right or the left the roller will ride within the sides bounded by the face 103 and the outer side of the cam. For instance, as shown in Fig. 14, at this time the roller will occupy the position shown and no drive will be effected. However, when the knob 97 is shifted the cam will be pivoted and the relative position between the cam and the roller will be shown by the dotted line in Fig. 14. Actually, the cam will move, but for picturization the roller is there shown as having moved. In this dotted line position the corresponding opening 104 of the cam and the roller 100 are in alignment with each other and the spring 107 may move the cam and plate 90 further to the right (Fig. 1). This will snugly engage the opening 104 and the roller 100 and the roller will prevent the cam and plate from tilting from the position in Fig. 11 back to the neutral position shown in Fig. 12. Thus drive will be maintained and the rolls will be continuously rotated.

Automatic safety mechanism

When the two rolls acting as a feed bite are separated a predetermined amount the operation of the wringer is automatically terminated by breaking the drive to the rolls. This is accomplished by mechanism best shown in Figs. 1, 5 and 13. A central shaft 110 passes across the wringer frame in the central bottom part thereof and has secured to it a pair of upstanding fingers 112. The lower mid-portion of each sheet metal journal 50 is slotted to receive a corresponding finger and the width of the slot is such that upon an excess pivoting of the journals 50 about the shaft of the lower pressure roll the fingers 112 will be rocked from the position shown in Fig. 4 to the position shown in Fig. 5. This movement will pivot the shaft and rock a finger 114 carried at the left-hand thereof. Pivotally hung on a pin 115, supported in the frame members 93, is a release member 116 mounted for pivoting in a plane normal to the plane of Fig. 1. An ear 117 is carried by the plate 90 and is contacted by the member 116 when the same is rotated clockwise a small amount. The lower portion of the member 116 is yoke shaped, as shown by dotted line in Fig. 9 at 118. The arms of the yoke are formed as shown in Fig. 13 and tilting of the shaft 110 will rock the finger 114 to engage the cam faces formed by bending the yokes 118 and pivot the member 116 clockwise, (Fig. 12). The member will accordingly abut and push against the portion 117 and push the cam 102 and the plate 90 to the left. This movement, as shown in Fig. 12, moves the corresponding opening 104 of the cam away from the roller 100 and allows the plate 90 to move from the position of Fig. 11 to the position of Fig. 12, which is the neutral drive position of the wringer and is effected under the impetus of the springs 84 and 85.

Similarly the roll rotation may be manually stopped by pivoting the top 38 to a neutral position which results in movement of the roller 100 up the inclined face 105 of the corresponding opening 104 to push the plate 90 to the left (Fig. 12) and similarly stop the roll rotation.

A drainboard is provided for our improved wringer which is automatically tilted from side to side as the top 38 is swung to shift the relative location of the pressure bite. This drainboard, as best shown in Figs. 1 and 7, comprises a slightly convex plate 120 pivoted as at 122 to the main frame of the wringer. An arm 124 at the unsupported end of the wringer, rises from the drainboard to engage an opening in an outstanding ear 125 carried by the right-side upright (Fig. 1). Thus, as shown in Fig. 7, the drainboard is swung from the neutral or solid line position to the active or dotted line position when the top 38 is tilted to the right. Correspondingly, when the top is tilted to the left the drainboard assumes an opposite position.

Assembly of the wringer is completed by securing the sub-frame and the main frame together. The sub-frame is positioned, as shown in Fig. 2, and is lowered into the main frame, the journals 50 being positioned between the corresponding upstanding ears of the main frame. A block 126, provided with an annular slot, engages and lies within a recess in an upstanding plate 127 which positions that end of the sub-frame against sidewise and axial displacement. Two ears on each side of the recess and forming part of the plate 127 extend above the block 126 and these are bent over to prevent the sub-assembly from being lifted out of position. At the other end of the wringer there is provided an upstanding frame member 127 slotted as the other member 127 and in alignment therewith. A threaded bolt 129 forming part of the sub-frame assembly bears against the journal of the roll 40 and a nut 128 is threaded thereon so that the member 127 may be clamped between the head of the bolt and the nut. Thus, the sub-frame is pivotally mounted in the main frame and yet is not subject to removal therefrom.

A shroud or casing encloses the working parts of our improved wringer and provides an attractive appearance for the same. This shroud, indicated at 130, is a sheet metal cover open at the bottom, which may be lowered over the assembled mechanism and bolted to the main frame of the wringer, as at 132 in Fig. 6.

Operation

In operation of the wringer the handle is first pulled toward the operator, in which position, by reason of the spring 60, wringing pressure is established between the top roll and that one of the lower rolls which is remote from the operator. At the same time, due to the configuration of the springs 54 an auxiliary feeding pressure is established between the top roll and that one of the lower rolls closest to the operator. To establish rotation of the rolls, the knob 97 is either pushed up or pulled down, depending on which direction of rotation is desired. This springs the roller 100 into locking position with the cam shown in Fig. 14. The mechanism is so arranged that the rolls may not be turned in a direction to feed clothes directly to the pressure roll bite. This is because the drive mechanism and the wringing pressure mechanism are so related that those rolls under wringing pressure may be rotated only in a direction to permit feeding thereto through the third roll establishing the feeding or intake bite.

If, during operation of the wringer, an excess of material is fed thereto, the lower roll, acting as an auxiliary intake member, will drop and rock the arms 112, rotating the rock shaft 110. A pin 114 in the shaft will, as shown in Figs. 11, 12 and 13, shift the driving mechanism to break the drive. This will stop the rotation of the wringer rolls. The wringing pressure is released by pushing on the top 38 in a direction away from the operator, at which time the sub-frame is tilted to a neutral position.

Other modes of applying the principle of our invention may be employed instead of the one explained, change being made as regards the structure herein disclosed, provided the means stated by any of the following claims or the equivalent of such stated means be employed.

We therefore particularly point out and distinctly claim as our invention:

1. In a wringer, a main frame, three rolls carried by said wringer with two rolls simultaneously coacting with the third roll to establish a pair of roll bites, a sub-frame pivotally mounted in said main frame, hangers slidably mounted on said sub-frame adapted to alternately engage and disengage both ends of one of said two rolls to establish a pressure clothes gripping bite between said one roll and the third roll pressure mechanism normally engaging said hangers and means to apply relatively light pressure between the said third roll and the remaining roll.

2. In a wringer, a main frame, three rolls carried by said wringer with two rolls simultaneously coacting with the third roll to establish a pair of roll bites, a sub-frame pivotally mounted in said main frame, hangers slidably mounted on said sub-frame and adapted to alternately engage and disengage both ends of one of said two rolls to establish a pressure clothes gripping bite between said one roll and the third roll, a leaf spring carried by said sub-frame and engaging said hangers and means to apply relatively light pressure between the said third roll and the remaining roll.

3. In a wringer, a main frame, a sub-frame pivotally mounted in said main frame, three rolls carried by said sub-frame with two rolls simultaneously coacting with the third roll to establish a pair of roll bites, hangers slidably mounted on said sub-frame and adapted to engage one or the other of said two rolls at both ends to establish a clothes gripping wringing bite between said one roll and the third roll, means on said main frame to limit lateral shifting of said two rolls when said sub-frame is swung, wringing pressure mechanism normally engaging said hangers to apply pressure between said third roll and alternately one of said two rolls and means to apply relatively light pressure between the said third roll and the remaining roll.

4. In a wringer, a main frame, a sub-frame pivotally carried thereby, a pair of rolls carried by said wringer, a third roll adapted to simultaneously coact with said pair of rolls to provide two clothes gripping bites, said sub-frame comprising a pair of uprights, a hollow top member joining said uprights, hangers carried by respective uprights and adapted to alternately engage the ends of one or the other of said lower rolls to restrain the same against movement away from the third roll, a leaf spring member within said hollow top member to coact with said hangers and apply wringing pressure between said third roll and one of said pair of rolls alternately and means to apply relatively light pressure between the said third roll and the other of said pair of rolls.

5. In a wringer, a main frame, a sub-frame adapted to be rotatably mounted on said main frame, a roll carried thereby, a pair of members upstanding from said main frame, a pair of members carried by said sub-frame and adapted to be interengaged with said main frame members and a longitudinally adjustable clamping device to engage a sub-frame and a main frame member to secure said frames together at one end and permit said sub-frame to be rotated with respect to said main frame about the axis of said sub-frame carried roll.

6. In a wringer, a main frame, a sub-frame, a roll carried thereby, two other rolls carried by said sub-frame and adapted to each coact with said first roll to provide a pair of clothes gripping bites, a pair of members upstanding from said main frame, a pair of members carried by said sub-frame and adapted to be interengaged with said main frame members and secured thereto to secure said frames together and permit said sub-frame to be rotated with respect to said main frame about the axis of said sub-frame carried first roll, and means in said main frame to limit lateral shifting of said two rolls without limiting tilting of the sub-frame when said sub-frame is tilted with respect to said main frame.

7. In a wringer adapted to extract liquid from material fed thereto, a frame, three rolls carried in said frame with a common roll coacting with each of the other two rolls to provide therewith a pair of clothes gripping bites, said rolls being positioned to provide a generally horizontal passage for clothes through said bites, one of said other two rolls being mounted in said frame for movement away from said common roll while maintaining a fixed axial distance from the third roll, means to apply resilient spring pressure of one degree between one of said other two rolls and said common roll and resilient pressure of another degree between the other of said other two rolls and said common roll at said roll bites respectively, means including a separable connection to drive said rolls to feed clothes from one roll bite to the other, said rolls being so arranged that material fed to one roll bite passes through the other roll bite without passing between said other two rolls which are maintained a fixed axial distance from each other and means carrying said spring pressure applying means swingably mounted on the axis of the common roll and capable of moving in either of opposite directions for simultaneously releasing said resilient pressure from each of said roll bites and disconnecting said driving means.

CHARLES B. WILLIAMS.
THANKMAR WALTER KAESTNER.